United States Patent
Borowski et al.

(10) Patent No.: US 7,180,964 B2
(45) Date of Patent: Feb. 20, 2007

(54) CONSTELLATION MANIPULATION FOR FREQUENCY/PHASE ERROR CORRECTION

(75) Inventors: Joerg Borowski, Dresden (DE); Uwe Eckhardt, Dresden (DE); Menno Mennenga, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 905 days.

(21) Appl. No.: 10/286,133

(22) Filed: Nov. 1, 2002

(65) Prior Publication Data

US 2004/0005017 A1 Jan. 8, 2004

(30) Foreign Application Priority Data

Jun. 28, 2002 (DE) ................. 102 28 999

(51) Int. Cl.
  *H03D 3/22* (2006.01)
  *H04L 27/22* (2006.01)
  *H04L 27/18* (2006.01)
  *H04L 27/10* (2006.01)

(52) U.S. Cl. ..................... 375/329; 375/279

(58) Field of Classification Search ................ 375/149, 375/229, 232, 261, 327, 329, 335, 344, 350, 375/279

See application file for complete search history.

(56) References Cited

U.S. PATENT DOCUMENTS

| | | | |
|---|---|---|---|
| 5,940,450 A * | 8/1999 | Koslov et al. | 375/344 |
| 5,982,807 A | 11/1999 | Snell | |
| 6,075,408 A * | 6/2000 | Kullstam et al. | 329/304 |
| 6,289,069 B1 | 9/2001 | Meyer | |
| 6,519,303 B1 * | 2/2003 | Matsuda et al. | 375/355 |
| 6,570,936 B1 * | 5/2003 | Meyer | 375/329 |
| 6,590,872 B1 * | 7/2003 | Shiue et al. | 370/314 |
| 6,621,857 B1 * | 9/2003 | Belotserkovsky et al. | 375/149 |
| 6,862,315 B1 * | 3/2005 | Garg et al. | 375/232 |
| 2002/0196861 A1 * | 12/2002 | Tzannes et al. | 375/261 |
| 2003/0058967 A1 * | 3/2003 | Lin et al. | 375/327 |

\* cited by examiner

*Primary Examiner*—Emmanuel Bayard
*Assistant Examiner*—Lawrence B. Williams
(74) *Attorney, Agent, or Firm*—Meyertons Hood Kivlin Kowert & Goetzel, P.C.; B. Noël Kivlin (57) ABSTRACT

An error correction technique for data communication receivers such as WLAN (Wireless Local Area Network) receivers is provided. The error correction technique is for correcting a frequency and/or phase error in an incoming digitally modulated signal. A constellation manipulator is provided that is adapted to manipulate the phase constellation system of the incoming digitally modulated system by mapping each constellation point of the phase constellation system to a predefined range of phase angles. The predefined range has a width of less than $2\pi$. Further, an error detector is provided that is connected to receive data from the constellation manipulator. The data pertains to the manipulated phase constellation system. The error detector is adapted to evaluate the data to detect the frequency and/or phase error.

57 Claims, 3 Drawing Sheets

CONSTELLATION MANIPULATION FOR FREQUENCY/PHASE ERROR CORRECTION

BACKGROUND OF THE INVENTION

1. Field of the Invention

The invention generally relates to data communications receivers and operation methods, and in particular to the correction of a frequency and/or phase error of an incoming digitally modulated signal.

2. Description of the Related Art

A WLAN (Wireless Local Area Network) system is a flexible data communications system implemented as an extension to or as an alternative for, a wired LAN. Using radio frequency or infrared technology, WLAN systems transmit and receive data over the air, minimizing the need for wired connections. Thus, WLAN systems combine data connectivity with user mobility.

Today, most WLAN systems use spread spectrum technology, a wide-band radio frequency technique developed for use in reliable and secure communication systems. The spread spectrum technology is designed to trade-off bandwidth efficiency for reliability, integrity and security. Two types of spread spectrum radio systems are frequently used: frequency hopping and direct sequence systems.

The standard defining and governing wireless local area networks that operate in the 2.4 GHz spectrum, is the IEEE 802.11 standard. To allow higher data rate transmissions, the standard was extended to 802.11b that allows data rates of 5.5 and 11 Mbps in the 2.4 GHz spectrum. This extension is backwards compatible.

When operating a WLAN receiver, code synchronization is necessary because the code is the key to despreading the desired information. A good synchronization is achieved when the coded signal arriving at the receiver is accurately timed in both its code pattern position and its rate of chip generation.

Generally, the synchronization process performed in any receiver can be divided into two phases. First, a synchronization acquisition is performed in to initially synchronize the receiver with a received signal. The second part of the synchronization follows the initial acquisition since the receiver must continue to operate in such a way that it remains locked with its code reference. That is, the receiver exactly tracks the coded incoming signal to cause its own code chip rate to match the incoming code chip rate as precisely as possible.

With respect to the synchronization algorithms used, receivers may be classified into data-aided and non data-aided receivers. The data-aided approach does not require a prior knowledge of the interference parameters but requires a training data sequence. Non data-aided (or blind) algorithms require no training data sequence but only knowledge of the desired user signal sequence and its timing.

In WLAN systems as well as in other spread spectrum communication systems, the signal on its way from the transmitter to the receiver experiences several distortions. A frequency or phase error may result from a frequency or phase offset of the radio frequency oscillators at the transmitter and the receiver. It may be the task of any synchronization unit within the receiver to perform an error correction, no matter if in the acquisition phase or in the tracking phase.

Figure 1:
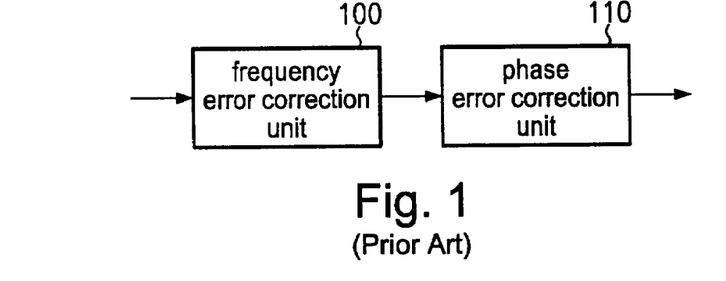
FIG. 1 is a schematic diagram illustrating an error correction arrangement of a conventional data communications receiver.

Turning now to FIG. 1, an error correction arrangement is schematically shown that comprises a frequency error correction unit 100 and a phase error correction unit 110. The frequency error correction unit 100 is used to compensate for the frequency difference, and the phase error correction unit 110 will then compensate for the residual phase error. Thus, the phase error correction unit 110 has the task to remove the remaining phase error such that the received signal is as close as possible to the transmitted signal, to minimize the probability of demodulation errors.

Error corrections circuits in existing data communications receivers such as WLAN receivers still have a number of problems. One problem is that conventional circuits often are highly involved and therefore lead to high circuit development and manufacturing costs. Moreover, such circuits usually require non-linear operations to be performed which are difficult to implement. Another disadvantage of existing circuits may be that the conventional adjustment processes may sometimes not be performed with sufficient phase or frequency resolution, and are restricted in use by the individual capabilities of the respective hardware implementation.

SUMMARY OF THE INVENTION

An improved error correction technique for data communication receivers such as WLAN receivers is provided that may be suitable for being implemented in a less involved hardware arrangement using digital circuits.

In one embodiment, a WLAN receiver is provided for receiving digitally modulated signals. The receiver comprises an error correction unit for correcting a frequency and/or phase error of an incoming digitally modulated signal. The error correction unit comprises a constellation manipulator adapted to manipulate the phase constellation system of the incoming digitally modulated signal by mapping each constellation point of the phase constellation system to a predefined range of phase angles. The predefined range has a width of less than $2\pi$. The error correction unit further comprises an error detector that is connected to receive data from the constellation manipulator. The data pertain to the manipulated phase constellation system. The error detector is adapted to evaluate the data to detect the frequency and/or phase error.

In another embodiment, there may be provided a data communications receiver for receiving digitally modulated signals. The receiver comprises an error correction unit for correcting a frequency and/or phase error of an incoming digitally modulated signal. The error correction unit comprises a constellation manipulator that is adapted to manipulate the phase constellation system of the incoming digitally modulated signal by mapping each constellation point of the phase constellation system to a predefined range of phase angles. The predefined range has a width of less than $2\pi$. The error correction unit further comprises an error detector that is connected to receive data from the constellation manipulator. The data pertain to the manipulated phase constellation system. The error detector is adapted to evaluate the data to detect the frequency and/or phase error.

In a further embodiment, an integrated circuit chip for use in a data communication receiver that receives digitally modulated signals, is provided. The integrated circuit chip comprises error correction circuitry for correcting a frequency and/or phase error of an incoming digitally modulated signal. The error correction circuitry comprises a constellation manipulation circuit that is adapted to manipulate the phase constellation system of the incoming digitally modulated signal by mapping each constellation point of the phase constellation system to a predefined range of phase angles. The predefined range has a width of less than $2\pi$. The error correction circuitry further comprises an error detection circuit that is connected to receive data from the constellation manipulation circuit. The data pertain to the manipulated phase constellation system. The error detection circuit is adapted to evaluate the data to detect the frequency and/or phase error.

In yet another embodiment, there is provided a method of operating a WLAN receiver that receives digitally modulated signals. The method comprises correcting a frequency and/or phase error of an incoming digitally modulated signal. The error correction comprises manipulating the phase constellation system of the incoming digitally modulated signal by mapping each constellation point of the phase constellation system to a predefined range of phase angles. The predefined range has a width of less than $2\pi$. The error correction further comprises evaluating data pertaining to the manipulated phase constellation system, to detect the frequency and/or phase error.

In still a further embodiment, there may be provided a method of operating a data communications receiver that receives digitally modulated signals. The method comprises correcting a frequency and/or phase error of an incoming digitally modulated signal. The error correction comprises manipulating the phase constellation system of the incoming digitally modulated signal by mapping each constellation point of the phase constellation system to a predefined range of phase angles. The predefined range has a width of less than $2\pi$. The error correction further comprises evaluating data pertaining to the manipulated phase constellation system, to detect the frequency and/or phase error.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

Figure 2:
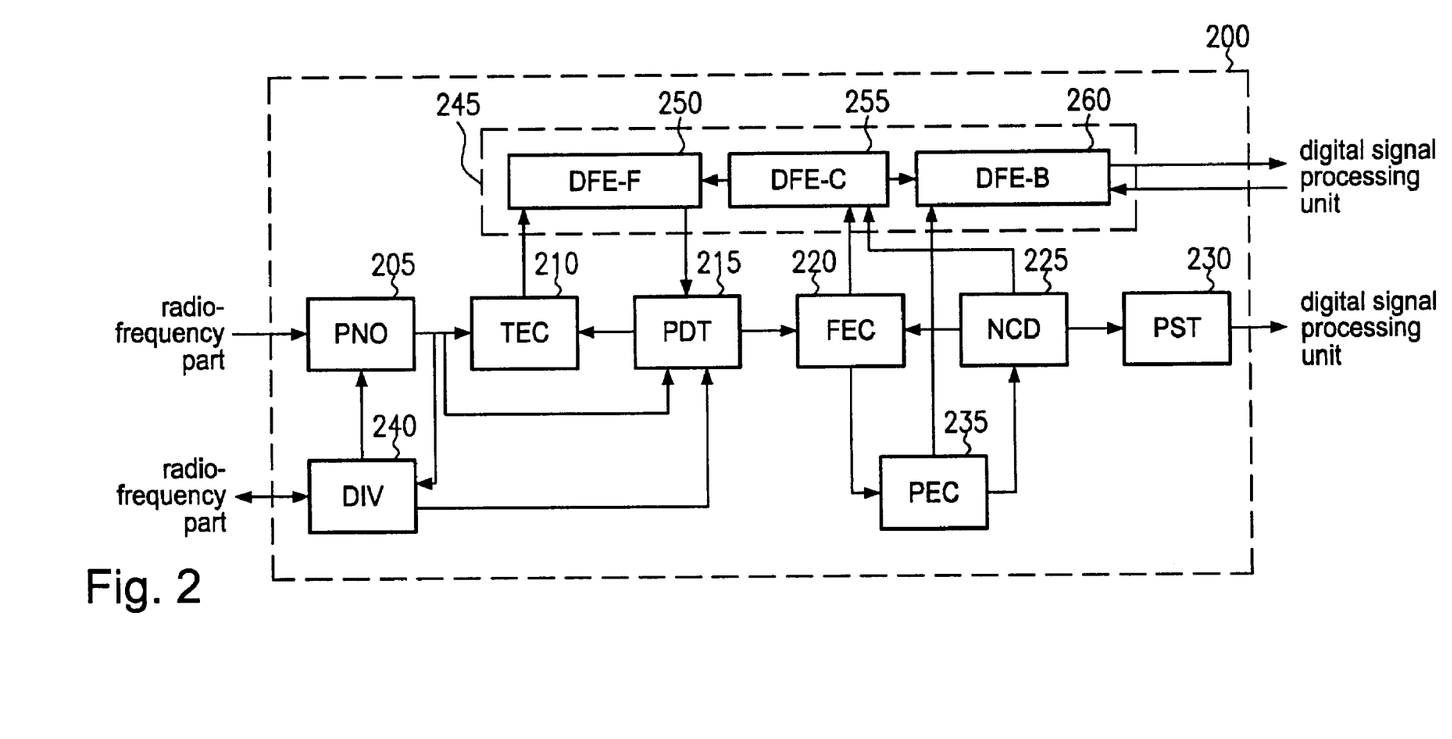
FIG. 2 is a diagram illustrating the components of a synchronization circuit of a WLAN receiver according to an embodiment.

Referring now to the drawings and particular to FIG. 2 which illustrates the components of a WLAN receiver according to an embodiment, the receiver comprises a synchronization baseband part 200 that is connected to a radio-frequency part. The radio-frequency part may be an analog circuit that receives an analog signal and provides a digitized representation thereof to the baseband part 200. Moreover, the radio-frequency part may perform an automatic gain control to control the amplification gain dependent on the received signal power or strength. The automatic gain controller is located in the analog radio-frequency part and interchanges control signals with the digital circuitry of the baseband part 200.

The baseband part 200 of the WLAN receiver of the present embodiment shown in FIG. 2 has a number of units that are interconnected to form a data path. That is, the baseband part 200 receives the digitized input signal from the radio-frequency part and generates output data that is to be filtered, demodulated, decoded and descrambled for further processing.

When receiving the digitized input signal in the baseband part 200, a power normalization (PNO) is performed in unit 205 to normalize the power of the input signal. The power normalization may be performed under control of a diversity selection (DIV) unit 240 that controls antenna diversity and which is connected to the automatic gain controller of the radio-frequency part. For performing the diversity selection, the diversity selection unit 240 receives the normalized signal from the power normalization unit 205.

The diversity selection unit 240 may further provide a control signal to a preamble detection (PDT) unit 215. The preamble detection unit 215 receives the normalized signal from the power normalization unit 205 and detects a preamble in this signal. A preamble is a special signal pattern used for synchronization acquisition.

As may be seen from FIG. 2, the preamble detection unit 215 provides output signals to a timing error correction (TEC) unit 210 and a frequency error correction (FEC) unit 220. These units are used to detect and correct timing errors and frequency errors, respectively.

As mentioned above, the preamble detection unit 215 receives the normalized input signal from power normalization unit 205. In addition, it receives input from the feedforward filter (DFE-F) 250 of a decision feedback equalizer 245. The feedforward filter 250 receives the output signal of the timing error correction unit 210 and filters this signal under control of decision feedback equalization controller (DFE-C) 255. The filtered signal is fed to the preamble detection unit 215.

As can further be seen from FIG. 2, the decision feedback equalization controller 255 may operate dependent on certain input signals that are received from the frequency error correction unit 220 and/or a non-coherent detection (NCD) unit 225. The non-coherent detection unit 225 filters and demodulates a signal that is received from the phase error correction (PEC) unit 235 to obtain a demodulated binary reference sequence. This binary reference sequence is fed into the decision feedback equalization controller 255 for joint processing with the data signal coming from frequency error correction unit 220.

The phase error correction unit 235 that provides a signal to the non-coherent detection unit 225 receives an output signal from the frequency error correction unit 220. That is, the frequency control and the phase control is done in two separate stages, and the phase error correction is performed based on a signal that has previously been corrected with respect to a frequency error.

As apparent from the figure, the phase error correction unit 235 further provides an input signal to the feedback filter 260 of the decision feedback equalizer 245. The feedback filter 260 filters this data to provide output data, and it is controlled by the decision feedback equalization controller 255. Further, the feedback filter 260 may receive a signal which is indicative of the data rate.

Moreover, there is provided a packet start detection (PST) unit 230 that detects the start of frame delimiter (SFD) portion in the received data signal to generate a packet start control signal. For this purpose, the packet start detection unit 230 receives input from the non-coherent detection unit 225.

Before going into the details of the error correction technique according to the embodiments performed in the frequency error correction unit 220 or the phase error correction unit 235, the embodiments generally apply a constellation manipulation by manipulating the phase constellation system of an incoming digitally modulated signal. It is therefore now referred to FIGS. 3 to 6 for explaining the constellation manipulation of the error correction technique of the embodiments.

Figure 3:
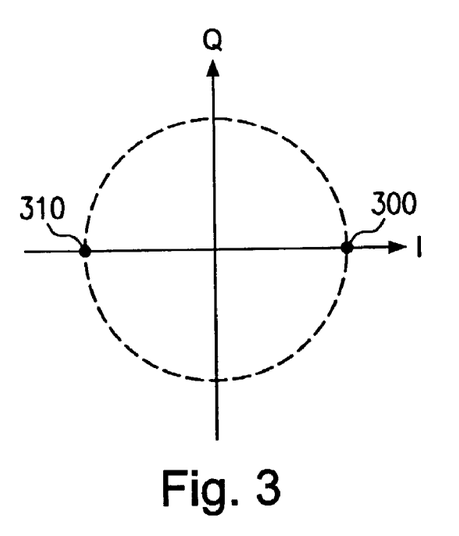
FIG. 3 is an ideal constellation diagram for BPSK (Binary Phase Shift Keying) modulated signals.

Referring first to FIG. 3, an ideal phase constellation system for BPSK modulated signals is depicted. Two constellation points 300, 310 exist that are 180° offset in phase. Ideally, the constellation points are located on the abscissa axis, i.e., the signals have no quadrature-phase component.

Figure 4:
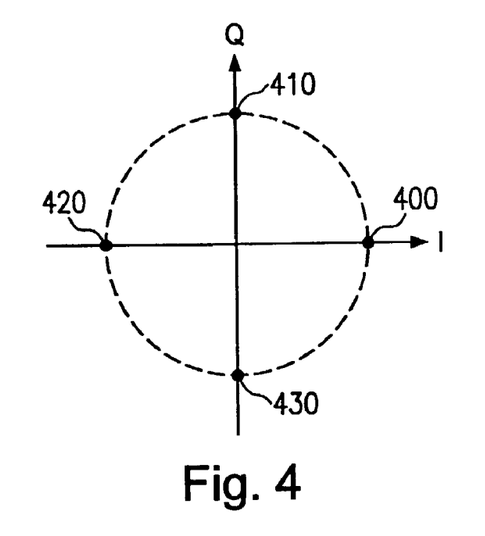
FIG. 4 is an ideal constellation diagram of QPSK (Quadrature Phase Shift Keying) modulated signals.

FIG. 4 illustrates the corresponding phase constellation system in case of a QPSK modulated signal. The constellation diagram includes four constellation points 400, 410, 420, 430 that are phase offset by 90°. In the phase constellation system of FIG. 4, the signal points form a diamond constellation, i.e., each of the constellation points has either no in-phase component or no quadrature-phase component.

Figure 5:
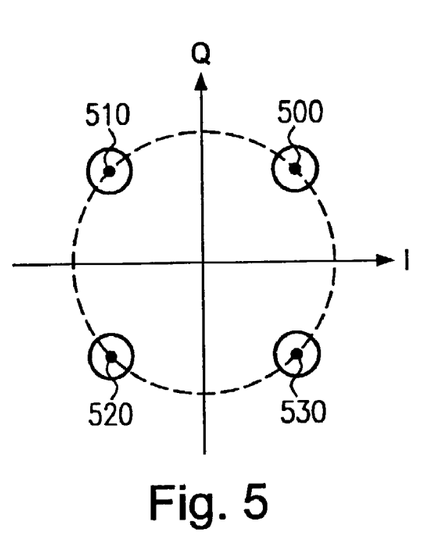
FIG. 5 is an example constellation diagram of a non-ideal QPSK modulated signal.

While the constellation diagrams of FIGS. 3 and 4 relate to the ideal case where no frequency or phase error exist and additionally, no noise is added to the incoming signals, a more realistic phase constellation diagram is shown in FIG. 5 for the case of QPSK modulated signals. In the example of FIG. 5, the four constellation points 500, 510, 520, 530 do not form a diamond constellation since the phase system is rotated due to a frequency and/or phase error that has not yet been compensated by a synchronization circuit of the receiver. In the example of FIG. 5, the phase constellation system is rotated by 45°, i.e. $\pi/4$, and it is to be noted that this angle is chosen for explanatory reasons only.

Besides the fact that the real phase constellation system of FIG. 5 is rotated compared with the ideal constellation diagram discussed above, there is another influencing quantity that lets the real phase system differ from the ideal phase system. This quantity is an additive white Gaussian noise that is added in the channel when transmitting the data signal from the transmitter to the receiver. This noise leads to a random deviation of each received signal point. In FIG. 5, this random distribution is indicated by a small circle around each signal point. The radius of the circle defines for each signal point a range of the most probable in-phase and quadrature phase values. The radius of the range may depend from the actual current channel condition.

As will be explained in more detail below, the embodiments perform a manipulation of the phase constellation system of the incoming digitally modulated signal such as the BPSK or QPSK modulated signal, by mapping each constellation point of this phase constellation system to a predefined range of phase angles. An example of the manipulated phase constellation system is shown in FIG. 6.

As apparent from this figure, the predefined range of phase angles is from $-\pi/4$ to $+\pi/4$, and thus has a width of less than $2\pi$, i.e., a width of $\pi/2$ in the present embodiment. When generating the manipulated phase constellation system of FIG. 6 starting from the QPSK constellation system of FIG. 5, each of the constellation points 500, 510, 520, 530 is mapped to the predefined range mentioned above. Thus, the manipulated phase constellation system of FIG. 6 includes only one constellation point which may then be easily evaluated for further processing.

Figure 6:
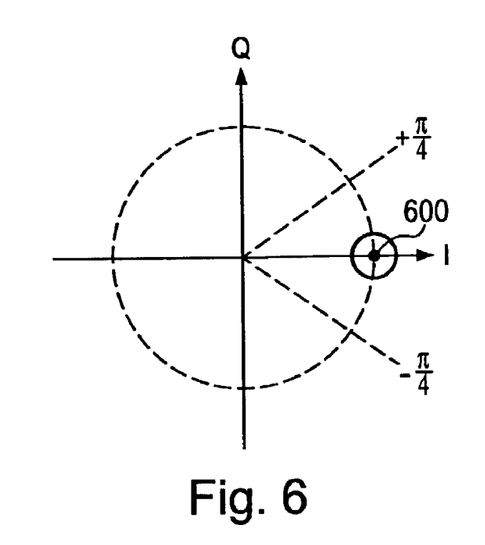
FIG. 6 illustrates a manipulated phase constellation system according to an embodiment.

When generating the manipulated phase constellation system of FIG. 6 from the phase constellation system of FIG. 5, the constellation points are mapped to the predefined range of phase angles by rotating the respective constellations by an angle of $n\pi/2+\pi/4$ where n is an integer number. Thus, the constellation points are continuously rotated by $\pi/2$ as long as the signal point falls into the range. Moreover, there may be an additional rotation by $\pi/4$, and it is to be noted that in other embodiments, different phase rotation steps could apply.

The above mentioned constellation manipulation may be easily performed using digital circuitry. For instance, a rotation by a phase angle of $\pi/2$ may simply be performed by sign and register content exchanges applied to the in-phase and quadrature-phase components. A rotation by $\pi$ may be performed by changing the sign of both components. A rotation by a phase angle of $\pi/4$ may be easily performed by multiplying the complex data signal with $0.71+0.71j$. Further, other digitally implemented functions may be used to manipulate the phase constellation system, for instance by flipping constellation points from one side of the phase constellation system to the other side. Further, the phase rotation of a signal point into the predefined range of phase angles may be done all at once, or may be subdivided in several sub-rotations. In the latter case, the constellation points will be rotated by a given phase step such as $+\pi/2$ or $-\pi/2$, and this rotation may be repeated several times.

Referring now back to FIG. 2, another embodiment of an error correction arrangement will now be discussed that may be performed in the frequency error correction unit 220. In this embodiment, the frequency error detection unit 220 may apply different detection algorithms depending on the actual synchronization stage. For instance in one or two preceding tracking periods, an externally generated symbol-based frequency error value may be used. In the subsequent tracking period, incoming chip samples are processed to estimate the phase difference between two chips that are offset in time. This phase difference indicates a frequency error, and once this frequency error is estimated, a second order loop filter may be used to perform a smooth operation by averaging the estimate.

A C code that may be used to digitally implement the constellation manipulation of this embodiment, is given below:

```
/* remove ambiguity caused by BPSK/QPSK modulation by
       mapping constellation into 1st quadrant */
    if (Re < 0.0) {
        Re = -Re;
        Im = -Im;
    }
    if (Im < 0.0) {
        Im = -Im;
        xtemp = Re;
```

-continued

```
            Re = Im;
            Im = xtemp;
        }
    /* map 1st quadrant onto range -Pi/4 < phase < +Pi/4 */
    if (Re > Im) {
        if (Re < 1e-98)
            xtemp = 0.0;
        else
            if (fxpfactorDiv > 0.0) {
                /* limits precision of divider output */
                xtemp = floor((Im / Re) * fxpfactorDiv)
                                / fxpfactorDiv;
                /* limits MSB of divider output or limits
                        abs(degree) <= Pi/2 */
                if (fabs(xtemp) > uboundDiv)
                    xtemp = ( xtemp / fabs(xtemp)) * uboundDiv;
            }
            else
                xtemp = Im/Re;
    }
    else {
        if (Im < 1e-98)
            xtemp = 0.0;
        else
            if (fxpfactorDiv > 0.0) {
                /* limits precision of divider output */
                /* factor -1 outside floor results in quant to
                        lower abs */
                xtemp = -1 * floor((Re/Im) * fxpfactorDiv)
                                / fxpfactorDiv;
                /* limits MSB of divider output or limits
                        abs(degree) <= Pi/2 */
                if (fabs(xtemp) > uboundDiv)
                    xtemp = ( xtemp / fabs(xtemp)) * uboundDiv;
            }
            else
                xtemp = -1 * Re/Im;
    }
}
```

In this embodiment the variable xtemp can be used in subsequent program steps to calculate the phase difference using an arc tangent function.

Figure 7:
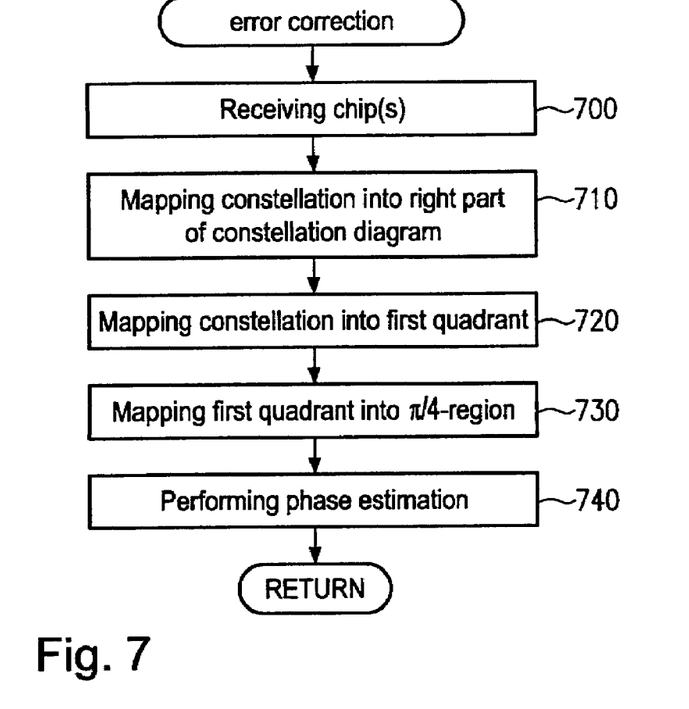
FIG. 7 is a flowchart illustrating an error correction process according to an embodiment.

As apparent from the frequency error detection program code listed above, an error correction process is performed as shown in FIG. 7. First, chips are received in step 700. Then, the constellation is mapped in step 710 into the right part of the constellation diagram, for each signal point that is located in the left part. In step 720, an additional mapping step is performed to map the signal points into the first quadrant. Then, another mapping step is performed to map the first quadrant into the predefined range of phase angles which is $-\pi/4$ to $+\pi/4$ in the present embodiment (step 730). Finally, a phase estimation is done in step 740.

Another embodiment relates to the phase error detection unit 235 of the synchronization circuit shown in FIG. 2. This phase error detection unit 235 may use BPSK or QPSK modulated chip samples to estimate the absolute phase error of a single complex chip. Further, there may again be an average second order loop filter following the phase error estimation.

A C code for digitally implementing the constellation manipulation in the phase error detection limit 235 is shown below. In this embodiment, the synchronization circuit 200 is still in a synchronization acquisition phase operating in the preamble period of the incoming data stream, and applying BPSK modulation. It is however noted that this restriction may not apply in other embodiments:

```
    /* remove ambiguity caused by BPSK modulation by
            mapping constellation into quadrants 1 and 4 */
    if (Re < 0.0) {
        Re = -Re;
        Im = -Im;
    }
    /* map into 1st quadrant and memorize original quadrant */
    quad = 1; /* default */
    if (Im < 0.0) {
        Im = -Im;
        xtemp = Re;
        Re = Im;
        Im = xtemp;
        quad = 4;
    }
    /* map 1st quadrant onto range -Pi/4 < phase < +Pi/4 */
    if (Re > Im && Re >= 1e-98) {
        if (FxpSwitchDiv) {
            /* limits precision of divider output */
            xtemp = floor((Im/Re) * fxpfactorDiv)
                            / fxpfactorDiv;
            /* limits MSB of divider output or limits
                    abs(degree) <= Pi/2 */
            if (fabs(xtemp) > uboundDiv)
                xtemp = ( xtemp / fabs(xtemp)) * uboundDiv;
        }
        else
            xtemp = Im/Re;
        quad = (quad == 1) ? 10 : 41;
    }
    else
        if (Im >= Re && Im >= 1e-98) {
            if (FxpSwitchDiv) {
                /* limits precision of divider output */
                /* factor -1 outside floor results in quant to
                        lower abs */
                xtemp = -1 * floor((Re/Im) * fxpfactorDiv)
                                / fxpfactorDiv;
                /* limits MSB of divider output or limits
                        abs(degree) <= Pi/2 */
                if (fabs(xtemp) > uboundDiv)
                    xtemp = ( xtemp / fabs(xtemp)) * uboundDiv;
            }
            else
                xtemp = -1 * Re/Im;
            quad = (quad == 1) ? 11 : 40;
        }
        else
            xtemp = 0.0;
```

In this example, the variable xtemp can be used in a subsequent function to calculate the absolute phase. Again, the code sequence can be understood as performing the error correction process of FIG. 7.

It is to be noted that other embodiments of the error correction process shown in FIG. 7 may exist where the sequence of method steps may differ from the depicted sequence. Some of the mapping steps may be dropped, and others may be added. Further, the various signal points may be processed even simultaneously.

As mentioned above, the outcome of the constellation manipulation technique of the embodiments may be used to calculate the frequency or phase error, e.g., by applying an arc tangent function. This may be done using an approximation of the arc tangent function. If the error detection is performed in a feedback loop configuration, the approximation may even be a first order Taylor series of the arc tangent function, i.e. $\arctan(x)=x$. In an alternative embodiment, a look-up table may be used that stores arc tangent functional data for approximation purposes. When using a look-up table, a higher order approximation can be applied without performance drawbacks.

Figure 8:
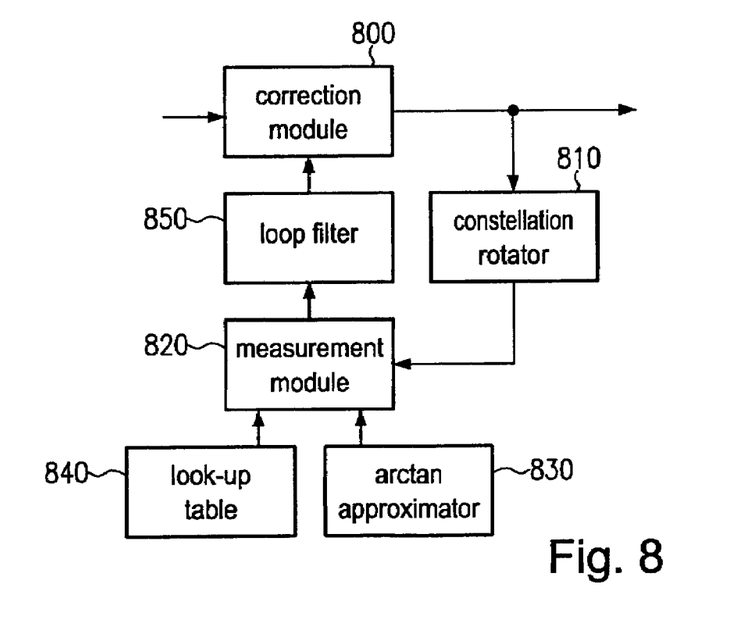
FIG. 8 is a block diagram of an error correction arrangement according to an embodiment.

A hardware implementation of the above embodiments that may be used e.g. in the frequency error correction unit 220 and the phase error correction unit 235 of the synchronization circuit 200, is depicted in FIG. 8. In this embodiment, an error detection arrangement is provided that includes a feedback loop configuration. There is provided a correction module 800 and a measurement module 820. The measurement module 820 receives, via constellation rotator 810, an output of the correction module 800 and measures the error in the output signal. Based on the measured error, the measurement module 820 issues a signal to the correction module 800 to allow the correction module 800 to perform an error correction.

The signal generated by the measuring module 820 may be a control signal that is directly supplied to the correction module 800, or may be the error estimate itself. Further, there may be a loop filter 850 provided between the measurement module 820 and the correction module 800 to perform the above mentioned smooth operation by averaging the output signal of the measurement module 820.

The constellation rotator 810 of the present embodiment is a digital circuit that is adapted to perform the above mentioned constellation manipulation by mapping the constellation points to the predefined range of phase angles. The data pertaining to the manipulated phase constellation system is supplied to the measurement module 820.

As apparent from FIG. 8, the measurement module 820 may have access to an arc tangent approximator 830 and/or a look-up table 840 to perform the above mentioned approximations. In another embodiment, the arc tangent approximator 830 and/or the look-up table 840 may be incorporated in the measurement module 820, or may even be dropped.

Thus, taking into account the above described embodiments, an error correction technique is provided that may remove the modulation from the incoming data stream by removing any ambiguity caused by the modulation. The technique may be implemented using digital circuitry, thus avoiding the conventional non-linear modulation removal techniques of the prior art.

It is to be noted that other embodiments may be used to manipulate the phase constellation systems in data communications systems where other modulation techniques than BPSK or QPSK are applied. For instance, DBPSK (Differential BPSK) may be used where an additional rotation by $+\pi/2$ or $-\pi/2$ may be performed for selected constellation points. Moreover, other modulation schemes where the number of signal points in the constellation diagram differ from 2 or 4, may be applied in other embodiments.

Furthermore, while in the above embodiments the predefined range of phase angles has been shown to range from $-\pi/4$ to $+\pi/4$, it is to be noted that other ranges may be used in other embodiments, as long as the width of the ranges remains less than $2\pi$. For instance, a predefined range of phase angles having a width of $\pi$ may be used when operating on BPSK modulated data signals. In other embodiments, a range having a width of $\pi/2$ may be used that is however not symmetrically centred around the abscissa axis as this was the case in FIG. 6.

Moreover, it is to be noted that while the above embodiments relate to either a frequency error correction unit 220 or a phase error correction unit 235, the embodiments may be used in a combined frequency phase error correction unit as well.

The above embodiments are in particular applicable to non-data aided frequency and/or phase correction circuits.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A WLAN (Wireless Local Area Network) receiver for receiving digitally modulated signals, the receiver comprising an error correction unit for correcting a frequency and/or phase error of an incoming digitally modulated signal, said error correction unit comprising:

a constellation manipulator adapted to manipulate a phase constellation system of said incoming digitally modulated signal by mapping each constellation point of said phase constellation system to a predefined range of phase angles, said predefined range having a width of less than $2\pi$; and an error detector connected to receive data from said constellation manipulator, said data pertaining to the manipulated phase constellation system, and adapted to evaluate said data to detect said frequency and/or phase error.

2. The WLAN receiver of claim 1, wherein said incoming digitally modulated signal is a QPSK (Quadrature Phase Shift Keying) modulated signal, and said predefined range of phase angles has a width of $\pi/2$.

3. The WLAN receiver of claim 2, wherein said predefined range of phase angles is from $-\pi/4$ to $+\pi/4$.

4. The WLAN receiver of claim 1, wherein said incoming digitally modulated signal is a BPSK (Binary Phase Shift Keying) modulated signal.

5. The WLAN receiver of claim 4, wherein said predefined range of phase angles has a width of $\pi$.

6. The WLAN receiver of claim 4, wherein said predefined range of phase angles has a width of it $\pi/2$.

7. The WLAN receiver of claim 1, wherein said constellation manipulator is capable of rotating constellation points of said phase constellation system by $+\pi/2$ or $-\pi/2$ when mapping the constellation points to said predefined range of phase angles.

8. The WLAN receiver of claim 7, wherein said constellation manipulator is capable of repeating said rotation within the mapping of one constellation point.

9. The WLAN receiver of claim 7, wherein said constellation manipulator is adapted to perform an additional rotation by $+\pi/4$ or $-\pi/4$.

10. The WLAN receiver of claim 7, wherein said incoming digitally modulated signal is a DBPSK (Differential Binary Phase Shift Keying) modulated signal and said constellation manipulator is adapted to perform an additional rotation by $+\pi/2$ or $-\pi/2$ for selected ones of said constellation points.

11. The WLAIN receiver of claim 1, wherein said constellation manipulator is capable of rotating constellation points of said phase constellation system by $+\pi$ or $-\pi$ when mapping the constellation points to said predefined range of phase angles.

12. The WLAN receiver of claim 11, wherein said constellation manipulator is adapted to perform an additional rotation by +π/4 or −π/4.

13. The WLAN receiver of claim 1, wherein said constellation manipulator is capable of flipping constellation points of said phase constellation system from one side of said phase constellation system to the other side when mapping the constellation points to said predefined range of phase angles.

14. The WLAN receiver of claim 13, wherein the constellation points on one of said one side or said other side of said phase constellation system have negative in-phase values while the constellation points on the other one of said sides have positive in-phase values.

15. The WLAN receiver of claim 13, wherein the constellation points on one of said one side or said other side of said phase constellation system have negative quadrature-phase values while the constellation points on the other one of said sides have positive quadrature-phase values.

16. The WLAN receiver of claim 1, wherein said constellation manipulator is adapted to perform a rotation of constellation points by +π/4 or −π/4 when mapping the constellation points of said phase constellation system to said predefined range of phase angles.

17. The WLAN receiver of claim 1, wherein said constellation manipulator and said error detector are connected in a feedback loop configuration.

18. The WLAN receiver of claim 1, wherein said error correction unit is adapted to correct a frequency error of said incoming digitally modulated signal, and said error detector is adapted to detect said frequency error by determining the phase difference between two chip samples of said incoming digitally modulated signal.

19. The WLAN receiver of claim 18, wherein said error detector is adapted to determine said phase difference in a synchronization tracking phase of the WLAN receiver.

20. The WLAN receiver of claim 19, wherein said synchronization tracking phase is preceeded by at least one other synchronization tracking phase where said error detector is operated not to determine said phase difference.

21. The WLAN receiver of claim 1, wherein said error correction unit is adapted to correct a phase error of said incoming digitally modulated signal, and said error detector is adapted to detect an absolute phase error of a single complex chip sample of said incoming digitally modulated signal.

22. The WLAN receiver of claim 21, wherein said error detector is adapted to detect said absolute phase error in a synchronization acquisition phase of the WLAN receiver.

23. The VTLAN receiver of claim 1, wherein said error correction unit is adapted to apply an estimation mechanism when evaluating said data to detect said frequency and/or phase error.

24. The WLAN receiver of claim 23, wherein said estimation mechanism comprises:
an approximation unit adapted to calculate an approximation to an arc tangent function.

25. The WLAN receiver of claim 24, wherein said constellation manipulator and said error detector are connected in a feedback loop configuration, and said approximation to an arc tangent function is a first order Taylor series of the arc tangent function.

26. The WLAN receiver of claim 23, wherein said estimation mechanism comprises:
a look-up table storing arc tangent functional data.

27. The WLAN receiver of claim 23, wherein said error correction unit further comprises:
a filter connected to receive an output from said estimation mechanism to perform a smooth operation thereon.

28. A data communications receiver for receiving digitally modulated signals, the receiver comprising an error correction unit for correcting a frequency and/or phase error of an incoming digitally modulated signal, said error correction unit comprising:
a constellation manipulator adapted to manipulate a phase constellation system of said incoming digitally modulated signal by mapping each constellation point of said phase constellation system to a predefined range of phase angles, said predefined range having a width of less than 2π; and
an error detector connected to receive data from said constellation manipulator, said data pertaining to the manipulated phase constellation system, and adapted to evaluate said data to detect said frequency and/or phase error.

29. An integrated circuit chip for use in a data communications receiver receiving digitally modulated signals, the integrated circuit chip comprising error correction circuitry for correcting a frequency and/or phase error of an incoming digitally modulated signal, said error correction circuitry comprising:
a constellation manipulation circuit adapted to manipulate a phase constellation system of said incoming digitally modulated signal by mapping each constellation point of said phase constellation system to a predefined range of phase angles, said predefined range having a width of less than 2π; and
an error detection circuit connected to receive data from said constellation manipulation circuit, said data pertaining to the manipulated phase constellation system, and adapted to evaluate said data to detect said frequency and/or phase error.

30. A method of operating a WLAN (Wireless Local Area Network) receiver receiving digitally modulated signals, the method comprising correcting a frequency and/or phase error of an incoming digitally modulated signal, said error correction comprising:
manipulating a phase constellation system of said incoming digitally modulated signal by mapping each constellation point of said phase constellation system to a predefined range of phase angles, said predefined range having a width of less than 2π; and
evaluating data pertaining to the manipulated phase constellation system, to detect said frequency and/or phase error.

31. The method of claim 30, wherein said incoming digitally modulated signal is a QPSK (Quadrature Phase Shift Keying) modulated signal, and said predefined range of phase angles has a width of π/2.

32. The method of claim 31, wherein said predefined range of phase angles is from −π/4 to +π/4.

33. The method of claim 30, wherein said incoming digitally modulated signal is a BPSK (Binary Phase Shift Keying) modulated signal.

34. The method of claim 33, wherein said predefined range of phase angles has a width of π.

35. The method of claim 33, wherein said predefined range of phase angles has a width of π/2.

36. The method of claim 30, wherein manipulating the phase constellation system comprises:
rotating constellation points of said phase constellation system by $+\pi/2$ or $-\pi/2$ when mapping the constellation points to said predefined range of phase angles.

37. The method of claim 36, wherein manipulating the phase constellation system comprises:
repeating said rotation within the mapping of one constellation point.

38. The method of claim 36, wherein manipulating the phase constellation system comprises:
performing an additional rotation by $+\pi/4$ or $-\pi/4$.

39. The method of claim 36, wherein said incoming digitally modulated signal is a DBPSK (Differential Binary Phase Shift Keying) modulated signal and manipulating the phase constellation system comprises:
performing an additional rotation by $+\pi/2$ or $-\pi/2$ for selected ones of said constellation points.

40. The method of claim 30, wherein manipulating the phase constellation system comprises:
rotating constellation points of said phase constellation system by $+\pi$ or $-\pi$ when mapping the constellation points to said predefined range of phase angles.

41. The method of claim 40, wherein manipulating the phase constellation system comprises:
performing an additional rotation by $+\pi/4$ or $-\pi 4$.

42. The method of claim 30, wherein manipulating the phase constellation system comprises:
flipping constellation points of said phase constellation system from one side of said phase constellation system to the other side when mapping the constellation points to said predefined range of phase angles.

43. The method of claim 42, wherein the constellation points on one of said one side or said other side of said phase constellation system have negative in-phase values while the constellation points on the other one of said sides have positive in-phase values.

44. The method of claim 42, wherein the constellation points on one of said one side or said other side of said phase constellation system have negative quadrature-phase values while the constellation points on the other one of said sides have positive quadrature-phase values.

45. The method of claim 30, wherein manipulating the phase constellation system comprises:
performing a rotation of constellation points by $+\pi/4$ or $-\pi/4$ when mapping the constellation points of said phase constellation system to said predefined range of phase angles.

46. The method of claim 30, wherein manipulating the phase constellation system and evaluating said data are performed in a feedback loop of said WLAN receiver.

47. The method of claim 30, wherein said error correction is for correcting a frequency error of said incoming digitally modulated signal, and evaluating said data comprises:
detecting said frequency error by determining the phase difference between two chip samples of said incoming digitally modulated signal.

48. The method of claim 47, wherein evaluating said data comprises: determining said phase difference in a synchronization tracking phase of the WLAN receiver.

49. The method of claim 48, wherein said synchronization tracking phase is preceeded by at least one other synchronization tracking phase where said phase difference is not determined.

50. The method of claim 30, wherein said error correction is for correcting a phase error of said incoming digitally modulated signal, and evaluating said data comprises:
detecting an absolute phase error of a single complex chip sample of said incoming digitally modulated signal.

51. The method of claim 50, wherein detecting said absolute phase error is performed in a synchronization acquisition phase of the WLAN receiver.

52. The method of claim 30, wherein evaluating said data comprises:
applying an estimation mechanism to detect said frequency and/or phase error.

53. The method of claim 52, wherein said estimation mechanism comprises:
calculating an approximation to an arc tangent function.

54. The method of claim 53, wherein manipulating the phase constellation system and evaluating said data are performed in a feedback loop of said WLAN receiver, and said approximation to an arc tangent function is a first order Taylor series of the arc tangent function.

55. The method of claim 52, wherein said estimation mechanism comprises:
accessing a look-up table storing arc tangent functional data.

56. The method of claim 52, wherein said error correction further comprises:
performing a smooth operation on an output signal from said estimation mechanism.

57. A method of operating a data communications receiver receiving digitally modulated signals, the method comprising correcting a frequency and/or phase error of an incoming digitally modulated signal, said error correction comprising:
manipulating a phase constellation system of said incoming digitally modulated signal by mapping each constellation point of said phase constellation system to a predefined range of phase angles, said predefined range having a width of less than $2\pi$; and
evaluating data pertaining to the manipulated phase constellation system, to detect said frequency and/or phase error.

* * * * *

UNITED STATES PATENT AND TRADEMARK OFFICE
CERTIFICATE OF CORRECTION

PATENT NO. : 7,180,964 B2 Page 1 of 1
APPLICATION NO. : 10/286133
DATED : February 20, 2007
INVENTOR(S) : Borowski et al.

It is certified that error appears in the above-identified patent and that said Letters Patent is hereby corrected as shown below:

<u>Column 10,</u>

Line 63; please change "WLAIN" to --WLAN--.

<u>Column 11,</u>

Line 51; please change "VTLAN" to --WLAN--.

Signed and Sealed this

Twenty-second Day of May, 2007

JON W. DUDAS
*Director of the United States Patent and Trademark Office*